US009136622B2

(12) United States Patent
Wang et al.

(10) Patent No.: US 9,136,622 B2

(45) Date of Patent: Sep. 15, 2015

(54) EXTRACTION DEVICE FOR MEMORY CARD

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Fang-You Wang, Shenzhen (CN); Chih-Hua Hsu, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 21 days.

(21) Appl. No.: 14/014,370

(22) Filed: Aug. 30, 2013

(65) Prior Publication Data

US 2014/0179136 A1 Jun. 26, 2014

(30) Foreign Application Priority Data

Dec. 25, 2012 (CN) .......................... 2012 1 0569120

(51) Int. Cl.

*G06K 13/08* (2006.01)
*H01R 12/70* (2011.01)
*H01R 13/62* (2006.01)

(52) U.S. Cl.

CPC ........ *H01R 12/7094* (2013.01); *H01R 13/6205* (2013.01)

(58) Field of Classification Search

CPC . G06K 7/0021; G06K 13/08; G06K 13/0806; G06K 13/0825; H01R 12/721; H01R 13/635; H01R 12/714; H01R 12/7094; H01R 27/00; H01R 12/7005; H01R 13/6275; H01R 12/57; H01R 13/2442; H01R 4/5066; H01L 2224/48227; H01L 2924/00

USPC .................................. 439/152, 155, 159, 160

See application file for complete search history.

(56) References Cited

U.S. PATENT DOCUMENTS

| | | | | |
|---|---|---|---|---|
| 5,600,539 | A * | 2/1997 | Heys et al. | 361/679.32 |
| 5,779,496 | A * | 7/1998 | Bolinger et al. | 439/377 |
| 5,805,219 | A * | 9/1998 | Ejima et al. | 348/375 |
| 6,319,028 | B1 * | 11/2001 | Zhang et al. | 439/159 |
| 7,866,996 | B2 * | 1/2011 | Achsaf et al. | 439/159 |
| 2012/0309213 | A1 * | 12/2012 | Lai | 439/159 |

* cited by examiner

*Primary Examiner* — Abdullah Riyami
*Assistant Examiner* — Nelson R Burgos-Guntin
(74) *Attorney, Agent, or Firm* — Novak Druce Connolly Bove + Quigg LLP

(57) ABSTRACT

An extraction device includes a first housing, a second housing slidable received in the first housing for receiving a memory card, an engaging member, a processor, communicating pins, an identifying pin, an elastic member and a popping delay member. The engaging member engages with the second housing or disengages from the second housing. The communicating pins and the identifying pin respectively connect with communicating pin connecting portions and an identifying pin connecting portion in the second housing. The elastic member drives the second housing away from the first housing when the engaging member is disengaged from the second housing. The popping delay member delays the second housing from popping out of the first housing when the identifying pin disconnects from the identifying pin connecting portion. The processor executes a program when the identifying pin and the identifying pin connecting portion are disconnected.

10 Claims, 3 Drawing Sheets

EXTRACTION DEVICE FOR MEMORY CARD

BACKGROUND

1. Technical Field

The present disclosure relates to extraction devices, and especially to an extraction device employed in an electronic device for receiving and extracting a memory card.

2. Description of Related Art

Many electronic devices, such as mobile phones, electronic readers, and computers, include a space to plug in a memory card. When a user wants to take out the memory card, a program is executed to save data in the memory card. However, the program must be started by the user. If the user forgets to start the program before taking out the memory card, the data in the memory card may be damaged.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the views.

DETAILED DESCRIPTION

Figure 1:
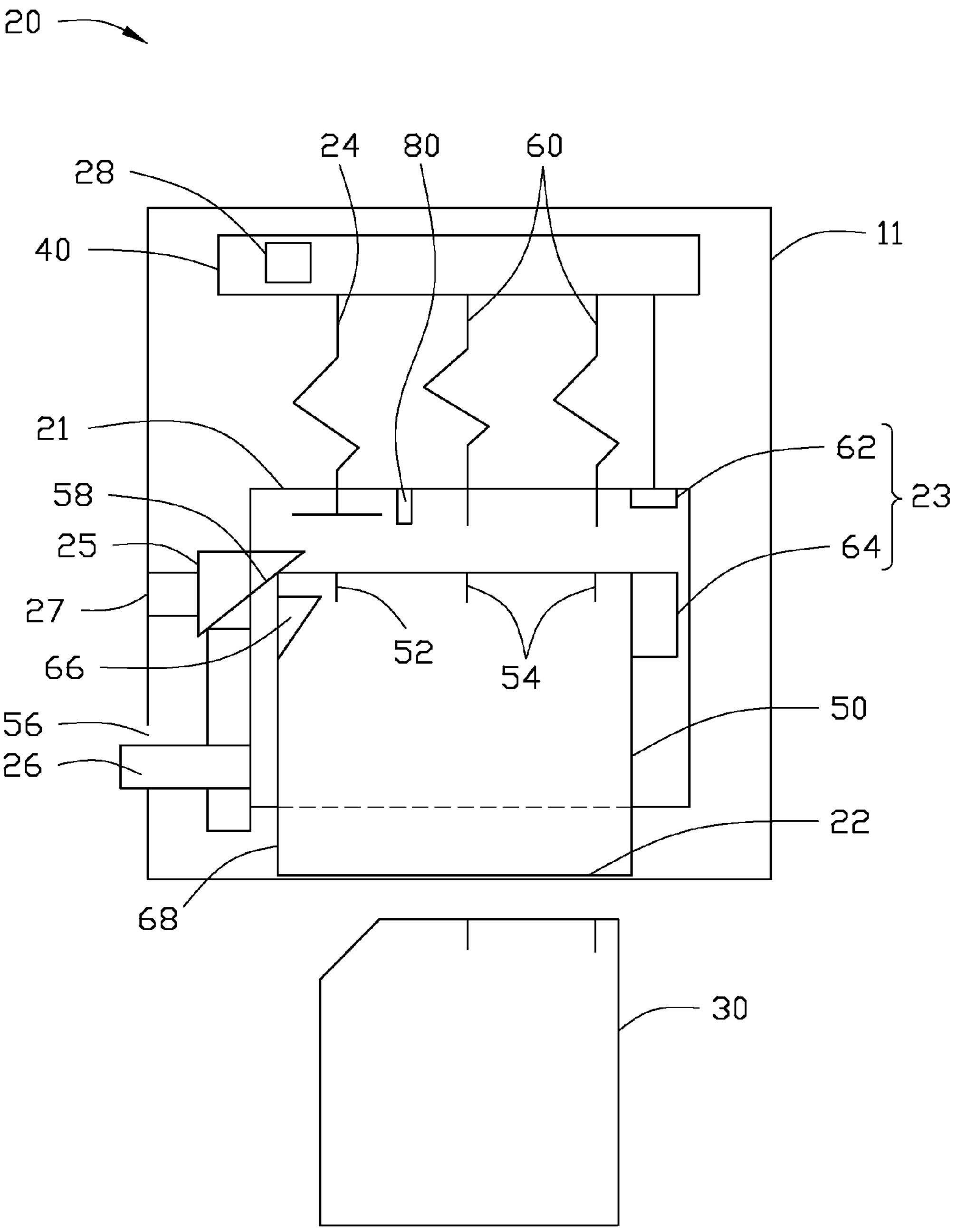
FIG. 1 is a schematic view of an extraction device in accordance with an exemplary embodiment of the present disclosure, showing the extraction device employed in a body of an electronic device, and also showing a memory card.
Figure 2:
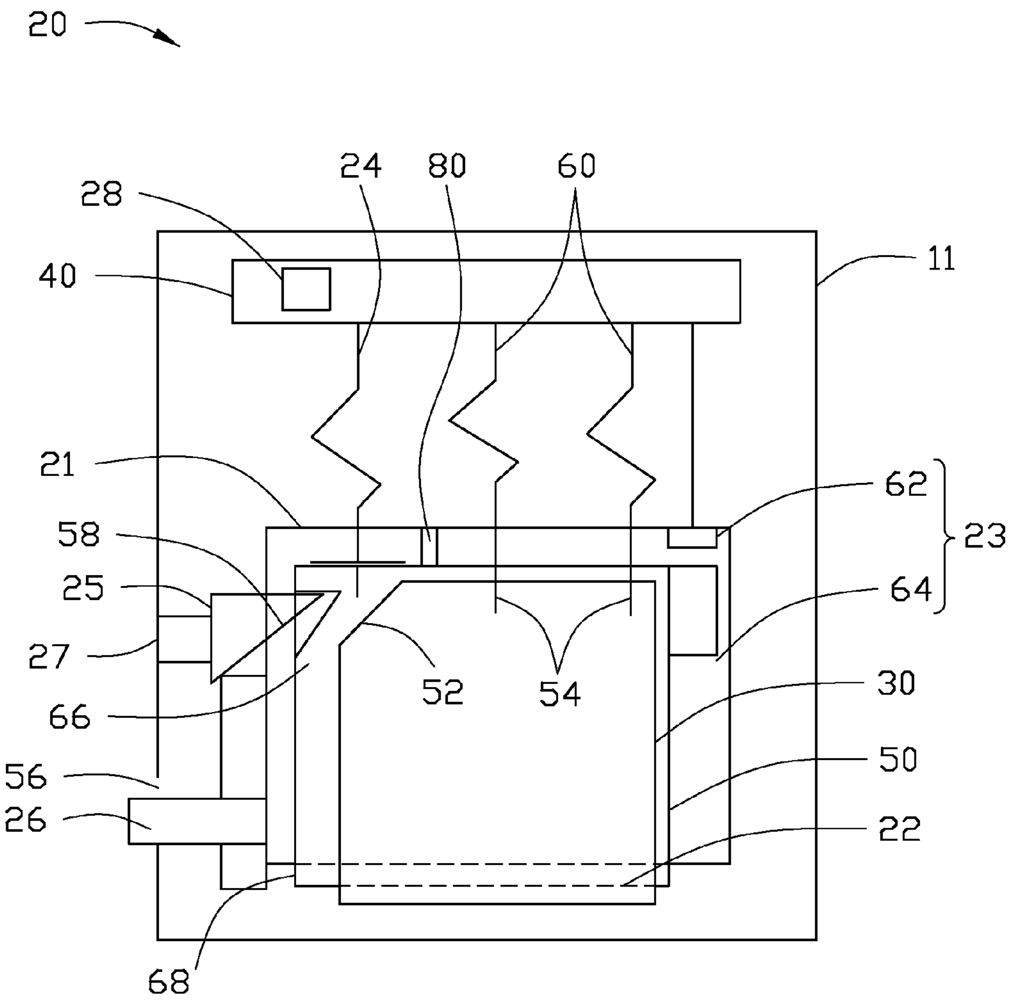
FIG. 2 is similar to FIG. 1, but showing the memory card inserted in a second housing of the extraction device, with an engaging member of the extraction device engaging in the second housing and holding the second housing in position.
Figure 3:
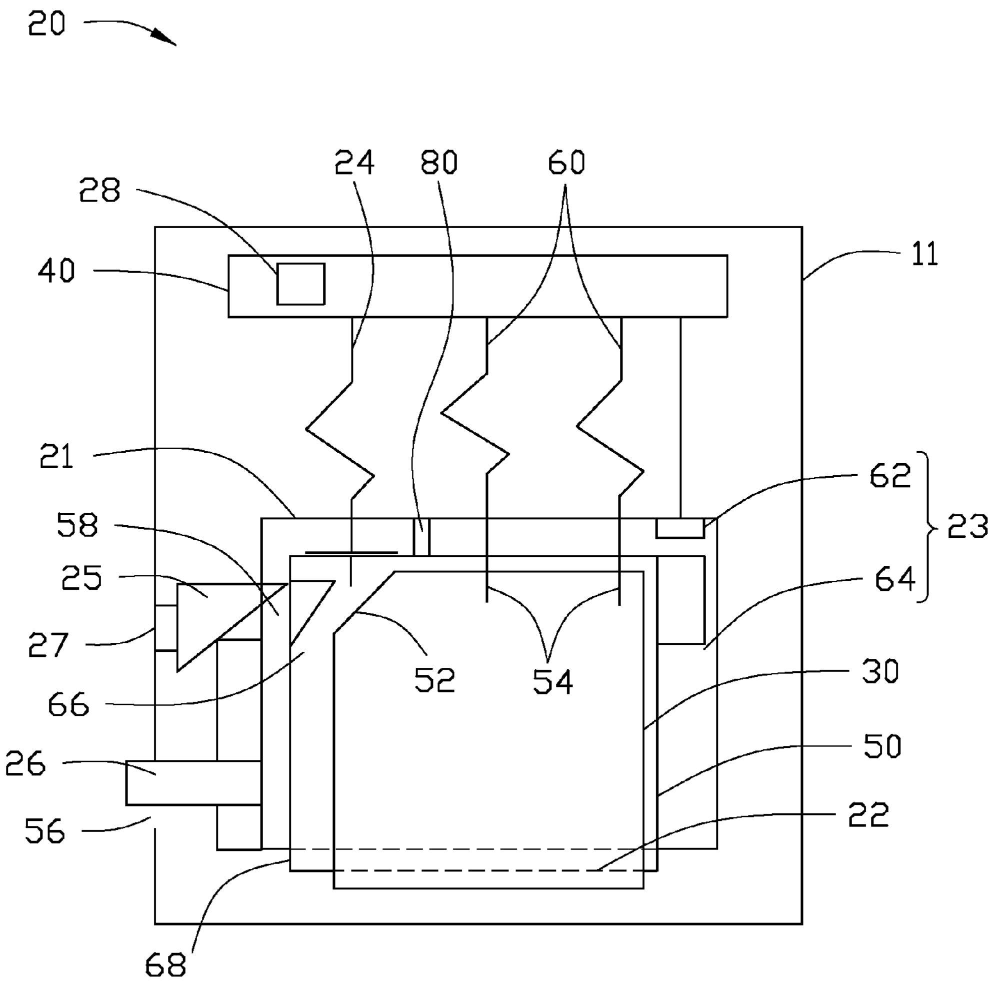
FIG. 3 is similar to FIG. 2, but showing a switch of the extraction device driving the engaging member to disengage from the second housing.

Referring to FIGS. 1-3, an extraction device 20, according to an exemplary embodiment, is employed in a body 11 of an electronic device for receiving and extracting of a memory card 30. The extraction device 20 includes a first housing 21 fixed to the body 11, a second housing 22 slidable received in the first housing 21 and configured for receiving the memory card 30, a popping delay member 23, an engaging member 25, an identifying pin 24, a number of communicating pins 60, a switch 26, a first elastic member 80, a second elastic member 27, a circuit board 40, and a processor 28 mounted on the circuit board 40.

The identifying pin 24 includes two opposite terminals. One of the terminals is electrically connected to the circuit board 40, while the other terminal is received by and electrically suspended in the first housing 21. In the present embodiment, an element "electrically suspended" means the element is not electrically connected to other electrical elements. Each of the communicating pins 60 includes two opposite terminals. One of the terminals of each communicating pin 60 is electrically connected to the circuit board 40, while the other terminal of each communicating pin 60 is received by and electrically suspended in the first housing 21. The suspended terminals of the communicating pins 60 are positioned closer to the second housing 22 than the suspended terminal of the identifying pin 24. An identifying pin connecting portion 52 and a number of communicating pin connecting portions 54 are arranged in the second housing 22. The first elastic member 80 is located in the first housing 21. One end of the first elastic member 80 is fixed to an inmost inner wall of the first housing 21, while the other end of the first elastic member 80 is suspended in the first housing 21. The suspended end of the first elastic member 80 is positioned closer to the second housing 22 than the suspended terminal of the identifying pin 24, and positioned farther away from the second housing 22 than the suspended terminals of the communicating pins 60. That is, the suspended end of the first elastic member 80 is located in an intermediate position between the suspended terminal of the identifying pin 24 and the suspended terminals of the communicating pins 60.

The communicating pin connecting portions 54 are configured to electrically connect the communicating pins 60 when the second housing 22 is slid toward and contacts the communicating pins 60. In the present embodiment, the communicating pins 60 insert into the communicating pin connecting portions 54 to establish the electrical connections. The identifying pin connecting portion 52 is configured to electrically connect the identifying pin 24 when the second housing 22 is slid further in the same direction and contacts the indentifying pin 24. During the further sliding, the first elastic member 80 is compressed, and the communicating pins 60 insert deeper into the communicating pin connecting portions 54 of the second housing 22 to remain in electrical connection with the communicating pin connecting portions 54.

One end of the second elastic member 27 is fixed to the engaging member 25, while the other end of the second elastic member 27 is fixed to the body 11. The engaging member 25 includes a wedge 58. The wedge 58 partly extends into the second housing 22 before the identifying pin connecting portion 52 connects the identifying pin 24. A groove 66 is defined in a sidewall 68 of the second housing 22, adjacent to the engaging member 25. The groove 66 is configured to receive an end of the wedge 58 when the identifying pin connecting portion 52 connects to the identifying pin 24.

In detail, when the memory card 30 is received in the second housing 22, and the second housing 22 is pushed by a user to slide toward the indentifying pin 24, the second housing 22 pushes the engaging member 25 against the second elastic member 27. The engaging member 25 causes the second elastic member 27 to compress and elastically deform, and the engaging member 25 moves away from the second housing 22 along a direction substantially perpendicular to the direction of movement of the second housing 22. During the pushing of the second housing 22 toward the indentifying pin 24, the second housing 22 reaches the first elastic member 80, and the second housing 22 compresses the first elastic member 80 while the second housing 22 further slides toward the indentifying pin 24. When the groove 66 becomes aligned with the wedge 58, the engaging member 25 is pushed by the elastic releasing force of the second elastic member 27 to be received in the groove 66, thereby preventing the second housing 22 from sliding further. The second housing 22 is maintained in a position where the identifying pin connecting portion 52 is electrically connected to the suspended terminal of the identifying pin 24, and the communicating pin connecting portions 54 are electrically connected to the suspended terminals of the communicating pins 60. Therefore, required communication paths between the processor 28 and the memory card 30 are established.

The switch 26 is approximately L-shaped, and is slidably fixed to the first housing 21. The body 11 defines a through hole 56 in a lateral sidewall thereof. One end of the switch 26 is positioned abutting the wedge 58, while the other end of the switch 26 partly extends out of the through hole 56 and protrudes from the body 11. The switch 26 is slidable in the through hole 56 along opposite directions parallel to the sidewall 68. The end of the switch 26 extending out of the through hole 56 is operable by a finger of a user. When the user pushes the end of the switch 26 extending out of the through hole 56 toward the engaging member 25, the end of the switch 26 abutting the wedge 58 also moves toward the engaging member 25. Thus the end of the switch 26 abutting the wedge 58 pushes against the wedge 58, whereby the switch 26 drives the engaging member 25 to push the second elastic member 27 away from the second housing 22 with the second elastic member 27 compressing and elastically deforming, and thereby the engaging member 25 disengages from the second housing 22.

When the engaging member 25 is disengaged from the second housing 22, the first elastic member 80 decompresses and pushes the second housing 22 away from the identifying pin 24, thereby disconnecting the identifying pin connecting portion 52 from the identifying pin 24. When the identifying pin 24 and the identifying pin connecting portion 52 are disconnected, the processor 28 automatically determines that the memory card 30 is being taken out and executes a program to save data in the memory card 30.

The popping delay member 23 is received in the first housing 21. The popping delay member 23 is configured to provide delayed popping of the second housing 22 out of the first housing 21 when the identifying pin 24 and the identifying pin connecting portion 52 are disconnected. In the exemplary embodiment, the popping delay member 23 includes an electromagnet 62 fixed to the inmost inner wall of the first housing 21 and electrically connected to the circuit board 40, and a pushing member 64 fixed to an external surface 50 of the second housing 22. The pushing member 64 is made of magnetic material. The processor 28 controls the flow of electric current to the electromagnet 62 to begin only when a preset time period from the start of the execution of the program has elapsed. The electromagnet 62 generates an electromagnetic field with a strength corresponding to the amount of electric current flowing to the electromagnet 62. The pushing member 64 is driven by a repulsive force of the electromagnetic field to move, thus pushing the second housing 22 to slide farther away from the identifying pin 24. The preset time period is equal to or longer than the time required for complete execution of the program. Thus, the communicating pin connecting portions 54 remain electrically connected to the communicating pins 60 during the execution of the program. Accordingly, data is successfully stored in the memory card 30 before the communicating pin connecting portions 54 disconnect from the communicating pins 60 and the memory card 30 is removed from the extraction device 20.

It is to be understood, however, that even though numerous characteristics and advantages of the present embodiments have been set forth in the foregoing description, together with details of the structures and functions of the embodiments, the present disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An extraction device employed in a body of an electronic device for receiving and extracting a memory card, the extraction device comprising:

a first housing fixed to the body;

a second housing slidable received in the first housing and configured for receiving the memory card, the second housing comprising an identifying pin connecting portion and a plurality of communicating pin connecting portions arranged therein;

an engaging member manually operable by a user and configured to selectively engage in the second housing or disengage from the second housing;

a circuit board;

an identifying pin comprising two opposite terminals, one of the terminals connected to the circuit board and the other of the terminals received by and electrically suspended in the first housing, the suspended terminal of the identifying pin connecting with the identifying pin connecting portion when the second housing is engaged in the first housing;

a plurality of communicating pins, each communicating pin comprising two opposite terminals, one of the terminals connected to the circuit board and the other of the terminals received by and electrically suspended in the first housing, the suspended terminal of each of the communicating pins extending further into the first housing than the suspended terminal of the identifying pin, the suspended terminals of the communicating pins connecting with the communicating pin connecting portions, respectively, when the second housing is engaged in the first housing;

a first elastic member received in the first housing and arranged to drive the second housing away from the first housing when the engaging member is disengaged from the second housing such that the identifying pin disconnects from the identifying pin connecting portion;

a popping delay member received in the first housing and configured to provide delayed popping of the second housing out of the first housing when the identifying pin and the identifying pin connecting portion become disconnected; and a processor mounted on the circuit board, configured to determine that the memory card is being taken out when the identifying pin and the identifying pin connecting portion become disconnected, and configured to execute a program to save data in the memory card upon making such determination, wherein the delay performed by the popping delay member is the same as or longer than a period of time of execution of the program such that the communicating pin connecting portions remain connected with the communicating pins during the execution of the program.

2. The extraction device as described in claim 1, further comprising a second elastic member, wherein one end of the second elastic member is connected to the engaging member, the other end of the second elastic member is connected to the body, the engaging member comprises a wedge, and the second housing defines a groove; when the second housing is slid into the first housing, the second housing rides along an end of the wedge and drives the wedge toward the body with the second elastic member being compressed; and when during the sliding of the second housing in the first housing the identifying pin becomes connected with the identifying pin connecting portion, the groove becomes aligned with the end of the wedge, and the second elastic member decompresses and drives the wedge to engage in the groove such that the second housing is engaged in the first housing.

3. The extraction device as described in claim 2, further comprising a slidable switch operatively coupled to the wedge and manually operable by a user; wherein when the second housing is engaged in the first housing and the switch is operated to slide toward the wedge, the switch rides along the wedge and drives the wedge toward the body with the second elastic member being compressed such that wedge is disengaged from the groove of the second housing.

4. The extraction device as described in claim 3, wherein during the sliding of the second housing in the first housing, the first elastic member becomes compressed before the identifying pin becomes connected with the identifying pin connecting portion and the first elastic member remains compressed when the identifying pin becomes connected with the identifying pin connecting portion.

5. The extraction device as described in claim 4, wherein when the wedge is disengaged from the groove of the second housing, the first elastic member decompresses and drives the second housing to slide in a direction out from the first housing.

6. The extraction device as described in claim 5, wherein when the first elastic member drives the second housing to slide in a direction out from the first housing, the identifying pin and the identifying pin connecting portion become disconnected, and the processor executes the program.

7. The extraction device as described in claim 3, wherein the switch is slidable fixed to the first housing, and is slidable back and forth along a sidewall of the first housing.

8. The extraction device as described in claim 7, wherein one end of the switch extends away from the sidewall of the first housing and is operable by a finger of the user, and an opposite end of the switch abuts the wedge of the engaging member.

9. The extraction device as described in claim 1, wherein the popping delay member comprises an electromagnet electrically connected to the circuit board and a pushing member fixed to an external surface of the second housing, the pushing member is made of magnetic material, and the processor controls electric current flowing to the electromagnet to control a strength of an electromagnetic field generated by the electromagnet, whereby the pushing member is driven by repulsive force of the electromagnetic field to move and thus drive the second housing to pop out of the first housing.

10. The extraction device as described in claim 1, wherein the first elastic member is located in the first housing, one end of the first elastic member is connected to an inmost inner wall of the first housing, the other end of the first elastic member is suspended in the first housing, and the suspended end of the first elastic member is located in an intermediate position between the suspended terminal of the identifying pin and the suspended terminals of the communicating pins.

* * * * *